US006940616B1

(12) United States Patent
Irisa

(10) Patent No.: US 6,940,616 B1
(45) Date of Patent: *Sep. 6, 2005

(54) DATA TRANSFER APPARATUS, METHOD OF CONTROLLING THE SAME, AND PRINTING SYSTEM

(75) Inventor: Naoki Irisa, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1034 days.

This patent is subject to a terminal disclaimer.

(21) Appl. No.: 09/596,294

(22) Filed: Jun. 16, 2000

(30) Foreign Application Priority Data

Jun. 16, 1999 (JP) ............................... P11-169777

(51) Int. Cl.⁷ ........................................... G06K 15/00
(52) U.S. Cl. ................................... 358/1.15; 358/1.13
(58) Field of Search ...................... 358/1.1, 1.6, 1.13, 358/1.14, 1.15, 1.16, 403, 400, 404; 710/1, 710/10, 15, 33, 64, 74

(56) References Cited

U.S. PATENT DOCUMENTS

| 5,303,382 A | 4/1994 | Buch et al. |
| 5,727,134 A | 3/1998 | Higuchi et al. |
| 5,774,356 A | 6/1998 | Hisatake et al. |
| 6,327,044 B1 | 12/2001 | Shima |

FOREIGN PATENT DOCUMENTS

| EP | 1 061 450 A2 * | 12/2000 | ............ G06F 13/20 |
| JP | 03-078019 | 4/1991 | |
| JP | 04-175922 | 6/1992 | |
| JP | 9-286147 | 11/1997 | |
| JP | 09 286147 A | 2/1998 | |
| JP | 10-067146 | 3/1998 | |
| JP | 10-228364 | 8/1998 | |
| JP | 10 228364 A | 11/1998 | |

OTHER PUBLICATIONS

Baderschneider K., et al., *Centronics-Schnittstellen automataisch umgeschaltet,*. Elektronik, vol. 34, No. 1, 1985, pp. 65-66.

* cited by examiner

*Primary Examiner*—Arthur G. Evans
(74) *Attorney, Agent, or Firm*—David G. Conlin; Steven M. Jensen; Edwards & Angell, LLP

(57) ABSTRACT

It is an object of the invention to provide a data transfer apparatus which, when data transfer requests from a plurality of interfaces are to be accepted and processed, can adjust the data transfer so as not to be partially performed on a specific host apparatus. When a plurality of host computers issue a data transfer request, a host I/F which is to be enabled to perform a data transfer is selected from a plurality of host I/Fs on the basis of a priority table. The selected host I/F sends a data transfer enabling signal to the host computer which is connected to the host I/F, to request print data transmission. The host computer which receives the transmission request transmits print data. The print data is transmitted to a printing apparatus via the host I/F which is connected to the host computer, and connecting means. Thereafter, the priority of the host I/F connected to the host computer which is the transmission source of the printed data is lowered to the lowest rank or by a predetermined number of ranks in the priority table.

12 Claims, 13 Drawing Sheets

FIG. 7A
PRIORITY TABLE
HIGH > > > > > > > LOW
| 1 | 2 | 3 | 4 | 5 | 6 | 6 | 5 | 4 | 3 | 2 | 1 |
FIG. 7B
PRIORITY TABLE
HIGH > > > > > > > LOW
| 2 | 3 | 4 | 1 | 5 | 6 | 6 | 5 | 4 | 3 | 2 | 1 |
FIG. 7C
PRIORITY TABLE
HIGH > > > > > > > LOW
| 2 | 3 | 4 | 5 | 6 | 6 | 1 | 5 | 4 | 3 | 2 | 1 |

FIG.8A

PRIORITY TABLE
HIGH > > > > > > > LOW
| 1 | 2 | 3 | 3 | 2 | 1 | 1 | 2 | 3 | 3 | 2 | 1 |

PRIORITY TABLE
HIGH > > > > > > > LOW
| 3 | 3 | 3 | 3 | 2 | 1 | 1 | 2 | 2 | 2 | 1 | 1 |

FIG. 9

| PRIORITY TABLE |
|---|
| HIGH > > > > > > > LOW |
| 1 | 2 | 3 | 3 | 2 | 1 | 1 | 2 | 2 | 1 | 1 | 1 |

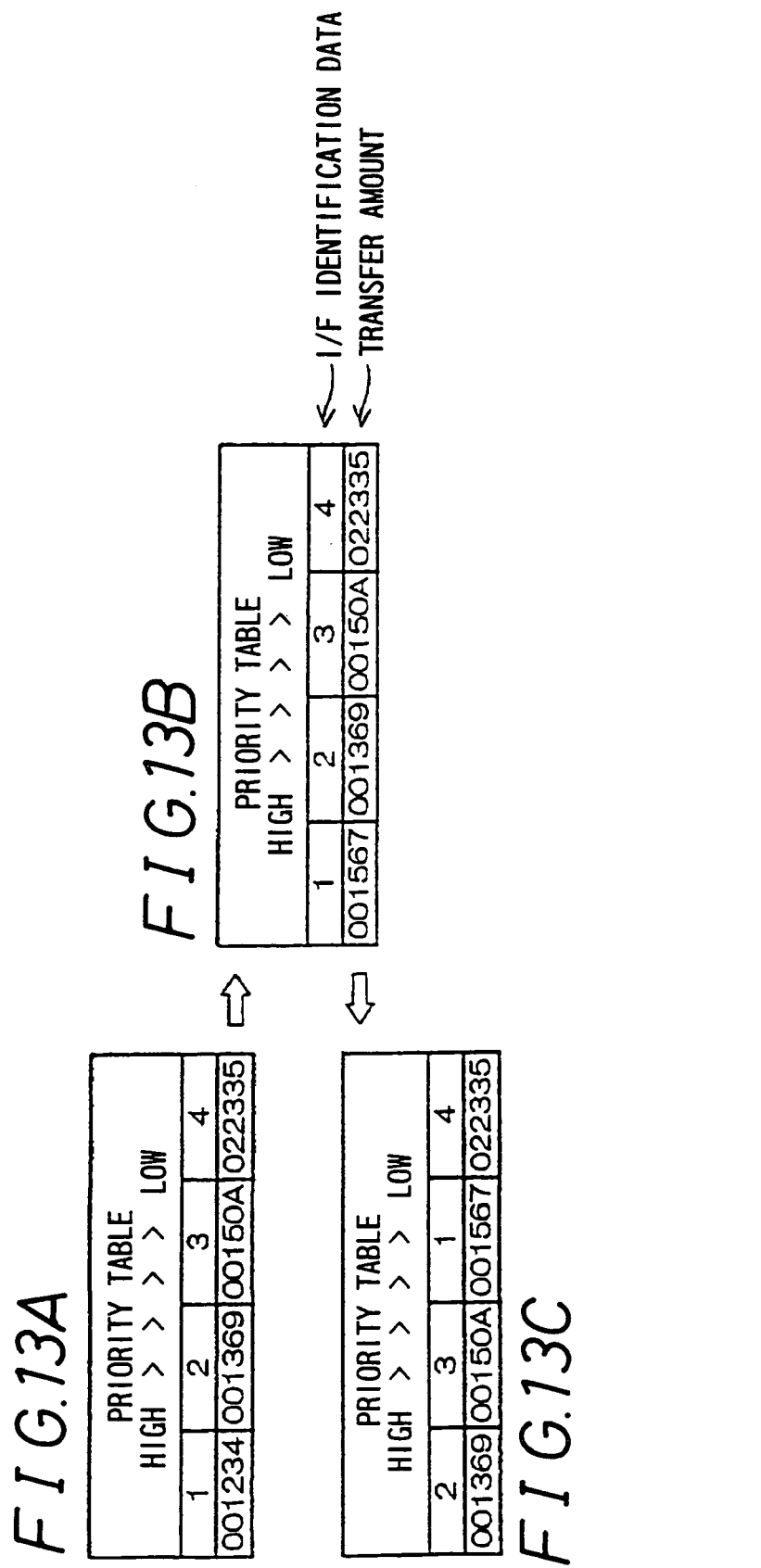

DATA TRANSFER APPARATUS, METHOD OF CONTROLLING THE SAME, AND PRINTING SYSTEM

BACKGROUND OF THE INVENTION

1. Field of the Invention

The present invention relates to a data transfer apparatus which accepts data transfer requests from a plurality of interfaces, and adjusts the sequence of processing the data transfer requests, and a method of controlling the apparatus, and also to a printing system using such a data transfer apparatus.

2. Description of the Related Art

Conventionally, an apparatus which simultaneously accepts data transfer requests from a plurality of interfaces and processes the requests is disclosed in, for example, Japanese Unexamined Patent Publication JP-A 9-286147 (1997). The apparatus comprises an auxiliary memory which is used for accumulating data transferred from the interfaces. Hereinafter, this disclosed apparatus is referred to as prior art 1.

Japanese Unexamined Patent Publication JP-A 10-228364 (1998) discloses a printer apparatus which sequentially accepts data transfer requests from a plurality of interfaces and processes the requests. Hereinafter, this disclosed apparatus is referred to as prior art 2. The prior art 2 printing apparatus is configured so that, during a period when a data transfer from a host apparatus which issues a data transfer request is accepted (hereinafter, such a host apparatus is referred to as first host apparatus), a data transfer request from another host apparatus cannot be accepted (hereinafter, such a host apparatus is referred to as second host apparatus). In the printer apparatus, therefore, the data transfer request from the second host apparatus is accepted after the data transfer from the first host apparatus is ended. In other words, data transfer requests from host apparatuses are sequentially accepted by the printer apparatus to be processed. As a method of performing the sequential acceptance, two methods, or (1) a prior art 2 method as shown in FIG. 8, and (2) a prior art 2 method as shown in FIG. 10 are disclosed.

In the prior art 2 method as shown in FIG. 8, if the second host apparatus issues a data transfer request during a period when the first host apparatus is performing a data transfer, the printer apparatus transmits NAK information to the second host apparatus to notify that the data transfer from the second host apparatus cannot be accepted. The second host apparatus repeatedly issues the data transfer request until the data transfer of the first host apparatus is ended.

In the prior art 2 method as shown in FIG. 10, if the first host apparatus issues a data transfer request, the printer apparatus transmits BUSY information to the second host apparatus. When the data transfer of the first host apparatus is ended, the printer apparatus transmits READY information to the second host apparatus. If the second host apparatus which receives the READY information has data to be transmitted, the second host apparatus transmits a data transfer request.

The prior art 2 data transfer technique in which data transfer requests are sequentially accepted as described above has a problem in that, when the first host apparatus which has just ended a data transfer issues a next data transfer request immediately after the end of the data transfer, the next data transfer request is often accepted in advance of data transfer requests from other host apparatuses, thereby causing a fear that a certain host apparatus continues to occupy the data transfer.

This problem can be solved by, as in the case of the prior art 1 apparatus, simultaneously accepting data transfer requests and then processing the requests. However, this countermeasure has a problem in that an auxiliary memory of a large capacity is required and hence the production cost is high.

SUMMARY OF THE INVENTION

It is an object of the invention to provide a data transfer apparatus which, when data transfer requests from a plurality of interfaces are to be accepted and processed, can adjust the data transfer so as not to be partially performed on a specific host apparatus, without using an auxiliary memory of a large capacity, a method of controlling the apparatus, and a printing system.

In order to solve the problems, the invention provides a data transfer apparatus interposed between a plurality of host apparatuses which perform a data transfer, and peripheral apparatuses which receive transfer data from the host apparatuses and process the data, for controlling a data transfer from the host apparatuses to the peripheral apparatuses, the data transfer apparatus comprising:

a plurality of host I/Fs disposed so as to be in a one-to one correspondence with the host apparatuses, for transmitting and receiving data to and from the corresponding host apparatuses, each of the plurality of host I/Fs having a register for holding a data transfer request from the corresponding host apparatus;

a rewritable priority table;

I/F selecting means for selecting one from among the host I/Fs holding a data transfer request, to be enabled to perform the data transfer, referring contents of the priority table; and connecting means for connecting the host I/F which is selected by the I/F selecting means, to the peripheral apparatus.

According to the invention, in the data transfer apparatus, even during a data transfer, a data transfer request can be accepted and then held into one of the registers. Therefore, a phenomenon that, depending on the timing when a host apparatus issues a data transfer request, a host apparatus which is enabled to perform a data transfer is partially selected does not occur. As a result, the data transfer apparatus can surely control the sequence of host apparatuses which are enabled to perform a data transfer.

In the invention it is preferable that the host I/F which is selected from among the plurality of host I/Fs by the I/F selecting means sends a data transfer enable signal to the corresponding host apparatuses.

According to the invention, a host apparatus which sends a data transfer request command can start a data transfer in response to the sending of the data transfer enabling signal. Therefore, it is not required to repeat polling, and the load can be reduced. In response to the sending of the data transfer enabling signal, the host apparatus corresponding to the selected host I/F can immediately start the data transfer, and hence a waste of waiting time due to the polling interval can be eliminated.

In the invention it is preferable that when a data transfer request from any one of the host apparatuses is received, a busy signal is sent to all of the host apparatuses via the host I/Fs, and the host I/F which is selected by the I/F selecting means makes the busy signal sent to the corresponding host apparatus inactive.

According to the invention, a host apparatus which sends a data transfer request command can start a data transfer as a result of inactivation of the busy signal. Therefore, even a host apparatus which performs a conventional polling control can use the data transfer apparatus of the invention without changing the control method.

In the invention it is preferable that the registers of the host I/Fs can hold a plurality of the data transfer requests.

According to the invention, even a host apparatus which is performing a data transfer can reserve the next data transfer. Therefore, the waiting time of the host apparatus can be shortened as compared with the case where the next data transfer request is issued after the data transfer is completed.

In the invention it is preferable that the rewritable priority table has a structure in which an order of arrangement of identification codes assigned to the respective host I/Fs as identification data indicates an order of priority of data transfer, and a rewriting process of transferring an identification code assigned to a host I/F which has completed the data transfer, to a lower priority of data transfer is performed.

According to the invention, the priority of a host I/F which has performed a data transfer is lowered, whereby the peripheral apparatus is prevented from being exclusively used by a specific host apparatus.

In the invention it is preferable that an arbitrary number of identification codes can be assigned to each of the host I/Fs.

According to the invention, the number of identification codes which are assigned to a specific host I/F can be increased, so that the priority of the host I/F can be made higher.

In the invention it is preferable that the rewritable priority table has a structure in which an order of arrangement of identification codes assigned to the respective host I/Fs indicates an order of priority of data transfer, and in the rewritable priority table, an identification code which is assigned to a host I/F which has received the data transfer request, is added to a lowest priority side of the arrangement, an identification code assigned to a host I/F which has completed the data transfer is deleted, and remaining identification codes in a lower priority side are sequentially made higher toward a position of the deleted identification code.

According to the invention, the data transfer apparatus can perform the data transfer in the order of acceptance of data transfer requests.

In the invention it is preferable that the priority table has a structure in which an order of arrangement of identification codes assigned to the respective host I/Fs paired with data transfer amounts indicates an order of priority of data transfer, and in the priority table, a transfer amount corresponding to a host I/F which has performed a data transfer is cumulatively updated, and the identification codes are rearranged so that a priority is higher as the transfer amount is smaller.

According to the invention, a data transfer can be performed while attaining impartiality, on the basis of the transfer amount in place of the number of transfers.

The invention provides a method of controlling a data transfer apparatus interposed between a plurality of host apparatuses which perform a data transfer, and peripheral apparatuses which receive transfer data from the host apparatuses and process the data, for controlling a data transfer from the host apparatuses to the peripheral apparatuses, the method comprising the steps of:

holding data transfer requests from the host apparatuses, in host I/Fs disposed so as to be in a one-to one correspondence with the host apparatuses;

selecting a host I/F from among host I/Fs holding a data transfer request, on the basis of an order of priority of a priority table which is rewritable, the selected host I/F being to be enabled to perform a data transfer; and when a data transfer is completed, updating a priority of the host I/F which has completed the data transfer, in the priority table.

According to the method of controlling a data transfer apparatus of the invention, a phenomenon that, depending on the timing when a host apparatus issues a data transfer request, a host apparatus which is enabled to perform a data transfer is partially selected does not occur. Furthermore, when the order of priority of data transfer is updated so that, for example, the priority of the host I/F which has completed a data transfer is lowered, the control of the order of data transfer can be impartially performed on the host apparatuses, and also a control in which a specific host apparatus is preferentially used can be performed.

In the invention it is preferable that the method further comprises the step of sending a data transfer enabling signal from the selected host I/F to a host apparatus corresponding thereto.

According to the invention, a host apparatus which sends a data transfer request command can start a data transfer in response to the sending of the data transfer enabling signal. Therefore, it is not required to repeat polling, and the load can be reduced. In response to the sending of the data transfer enabling signal, the host apparatus which is connected to the selected host I/F can immediately start the data transfer, and hence a waste of waiting time due to the polling interval can be eliminated.

In the invention it is preferable that the method further comprises the steps of, when a data transfer request from any one of the host apparatuses is received, sending a busy signal to all of the host apparatuses via the host I/Fs, and making the selected host I/F to cause the host apparatus corresponding thereto, to inactivate the busy signal.

According to the invention, a host apparatus which sends a data transfer request command can start a data transfer as a result of inactivation of the busy signal. Therefore, even a host apparatus which performs a conventional polling control can use the data transfer apparatus of the invention without changing the control method.

The invention provides a printing system comprising a plurality of host apparatuses for performing a data transfer; a printing apparatus for receiving data transferred from the host apparatuses and performing a printing process; and the above-described data transfer apparatus which is connected between the host apparatuses and the printing apparatus.

According to the invention, it is possible to realize a printing system in which a phenomenon that, depending on the timing when a host apparatus issues a data transfer request, a host apparatus which is enabled to perform a data transfer is partially selected does not occur.

BRIEF DESCRIPTION OF THE DRAWINGS

Other and further objects, features, and advantages of the invention will be more explicit from the following detailed description taken with reference to the drawings wherein:

FIGS. 7A to 7C are diagrams showing another embodiment of specific example 1 of the method of changing the order of priority of data transfer in the priority table;

FIGS. 8A and 8B are diagrams showing a further embodiment of specific example 1 of the method of changing the order of priority of data transfer in the priority table;

FIG. 9 is a diagram showing a still further embodiment of specific example 1 of the method of changing the order of priority of data transfer in the priority table;

FIGS. 13A to 13C are diagrams showing specific example 3 of the method of changing the order of priority of data transfer in a priority table.

DETAILED DESCRIPTION OF THE PREFERRED EMBODIMENT

Hereinafter, embodiments of the invention will be described with reference to the accompanying drawings.

Figure 1:
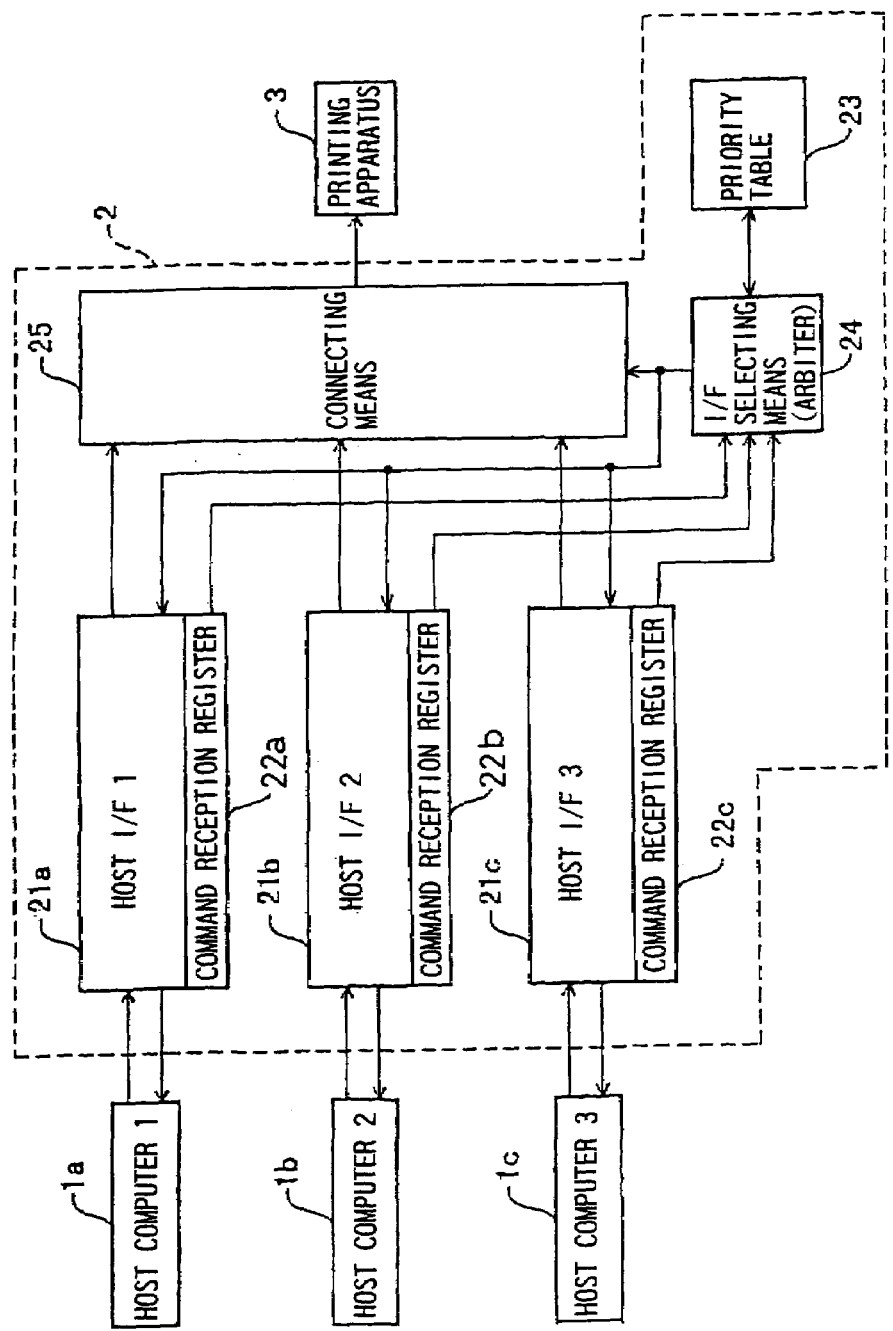
FIG. 1 is a block diagram showing an embodiment of a printing system to which the data transfer apparatus of the invention is applied.

FIG. 1 is a block diagram showing an embodiment of a printing system to which the data transfer apparatus of the invention is applied.

The printing system is configured by: a plurality of (three in the embodiment) host computers (host apparatuses) 1a, 1b, and 1c which perform a data transfer; a printing apparatus (peripheral apparatus) 3 which receives data transferred from the host computers 1a, 1b, and 1c and performs a printing process on the data; and a data transfer apparatus 2 which is connected between the host computers 1a, 1b, and 1c and the printing apparatus 3, and which controls data transfers from the host computers 1a, 1b, and 1c to the printing apparatus 3.

The data transfer apparatus 2 comprises: a plurality of (three in the embodiment) host I/Fs 21a, 21b, and 21c which transmit and receive data to and from the host computers 1a, 1b, and 1c, respectively; a priority table 23 which is rewritable; I/F selecting means 24 (arbiter) for referring contents of the priority table 23, and for selecting one of the host I/Fs 21a, 21b, and 21c holding a data transfer request, to be enabled to perform a data transfer; and connecting means 25 for connecting the host I/F which is selected by the I/F selecting means 24, to the printing apparatus 3.

The host I/Fs 21a, 21b, and 21c are disposed for the host computers 1a, 1b, and 1c, respectively, and comprise command reception registers 22a, 22b, and 22c which hold a data transfer request sent from the host computers 1a, 1b, and 1c. It is assumed that one of the host I/Fs 21a, 21b, and 21c receives a data transfer request. When a data transfer from the corresponding one of the host computers 1a, 1b, and 1c to the printing apparatus 3 is enabled or a data transfer enabled state is established, the one of the host I/Fs 21a, 21b, and 21c sends a data transfer enabling signal to the corresponding host computer 1a, 1b, or 1c. After receiving the data transfer enabling signal, the host computer 1a, 1b, or 1c transfers print data to the printing apparatus 3 via the corresponding host I/F 21a, 21b, or 21c and the connecting means 25. As a result, the printing apparatus implements a printing process on the basis of the transferred print data.

According to this configuration, each of the host computers 1a, 1b, and 1c is not required to perform polling in which a data transfer request is repeatedly transmitted until a data transfer is enabled, and hence the load on the CPU is reduced. Each of the host I/Fs 21a, 21b, and 21c is requested only to hold a data transfer request, and not to store transferred data itself, and hence is not required to have a memory of a large capacity.

Each of the command reception registers 22a, 22b, and 22c may be configured so that the register can simultaneously hold a plurality of data transfer requests. In this case, even the host computer 1a, 1b, or 1c which is performing a data transfer can reserve the next data transfer. Therefore, the waiting time of the host computer 1a, 1b, or 1c can be shortened as compared with the case where the next data transfer request is issued after the data transfer is completed.

When plural ones of the host computers 1a, 1b, and 1c issue a data transfer request, the I/F selecting means 24 refers the rewritable priority table 23 to select one of the host I/Fs 21a, 21b, and 21c which is to be enabled to perform a data transfer. The selected host I/F (for example, 21a) sends the data transfer enabling signal to the host computer 1a. The host computer 1a which receives the data transfer enabling signal transfers the print data to the printing apparatus 3 via the host I/F 21a and the connecting means 25 of the data transfer apparatus 2. The printing apparatus then implements the printing process.

Figure 2:
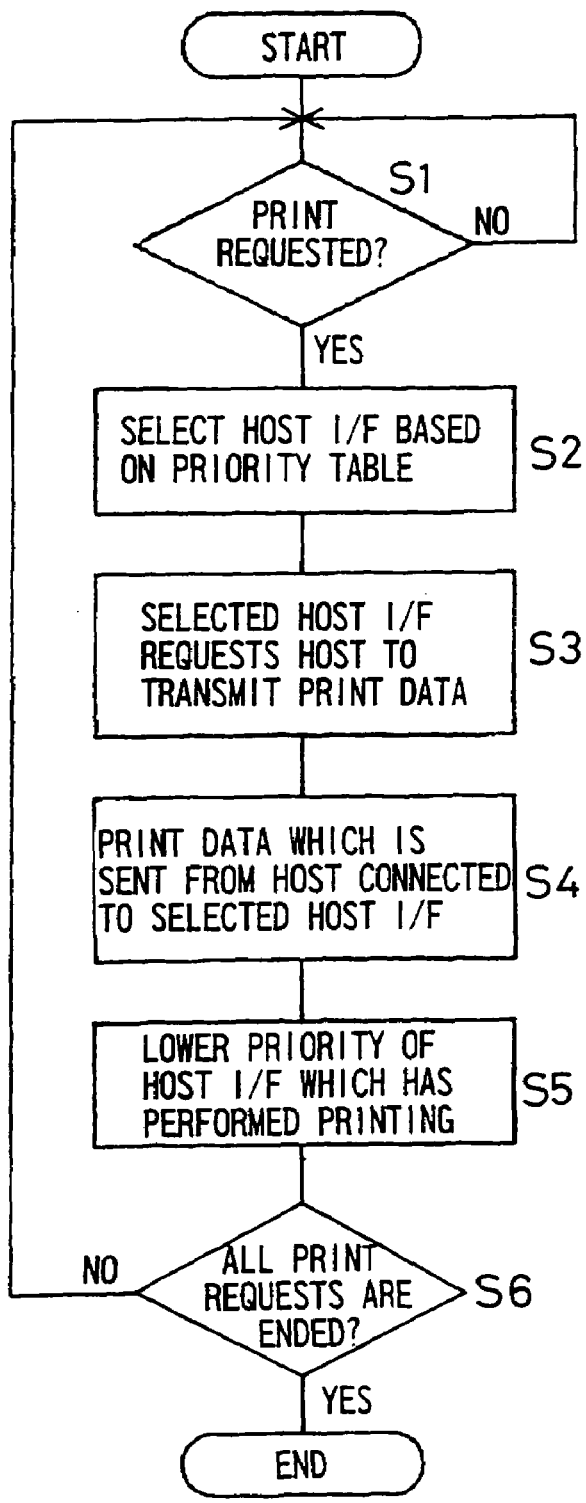
FIG. 2 is a flowchart showing the operation of an embodiment of a printing system in which the data transfer apparatus of the invention is used.

Next, the operation of a printing system in which the thus configured data transfer apparatus is used will be described with reference to a flowchart of FIG. 2.

First, in the data transfer apparatus 2, it is checked whether a data transfer request, i.e., a print request is issued from the host computers 1a, 1b, and 1c or not (S1). If a data transfer request is issued, a host I/F which is to be enabled to perform a data transmission is selected from all the host I/Fs 21a, 21b, and 21c which are outputting a data transfer request, and supplies the data transfer enabling signal to only the selected host I/F (S2). Each of the host I/Fs which are not selected continues to transmit the data transfer request until it is selected. The selected host I/F, for example, the first host I/F 21a sends the data transfer enabling signal to the host computer 1a which is connected to the host I/F, to request the computer to transmit print data (S3). The host computer 1a which receives the transmission request transmits print data. The print data is transmitted to the printing apparatus 3 via the host I/F 21a connected to the host computer 1a which is the transmission source, and the connecting means 25, and then used in the printing process (S4). Thereafter, the priority of the host I/F 21a connected to the host computer which is the transmission source of the printed data is lowered in the priority table 23 (S5). The priority change in the priority table 23 will be described later. The data transfer apparatus 2 implements the above-mentioned process on all of the print requests. Specifically, if the printing process has not yet been performed with respect to all of the print requests, or if the result of judgement in step S6 is No, the control returns to step S1, and, if the printing process has been performed with respect to all of the print requests, or if the result of the judgement in step S6 is Yes, the process is ended.

Figure 3:
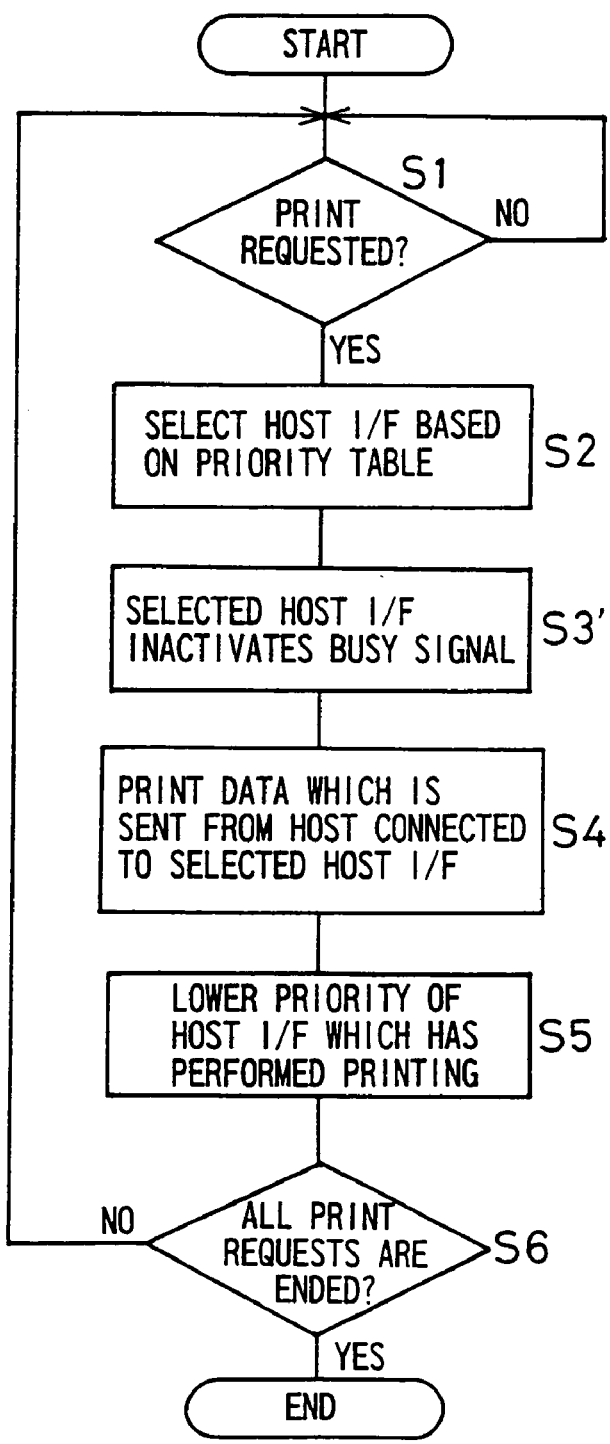
FIG. 3 is a flowchart showing the operation of another embodiment of a printing system in which the data transfer apparatus of the invention is used.

In the process operation described above, when one of the host computers 1a, 1b, and 1c which is to be enabled to perform a data transfer is selected, the data transfer is started by sending the data transfer enabling signal. Alternatively, the data transfer may be started by using a busy signal in place of the data transfer enabling signal. FIG. 3 is a flowchart showing the operation in the alternative.

First, in the data transfer apparatus 2, it is checked whether a data transfer request, i.e., a print request is issued from the host computers 1a, 1b, and 1c or not (S1). If a data transfer request is issued, a busy signal is sent to all the host computers 1a, 1b, and 1c via the host I/Fs 21a, 21b, and 21c. Under this state, a host I/F, for example, the first host I/F 21a which is to be enabled to perform a data transmission is selected on the basis of the priority table 23 (S2). Then, the selected host I/F 21a inactivates the busy signal for the host computer 1a connected to the host I/F (S3'). As a result, the host computer 1a in which the busy signal is inactivated is enabled to perform a data transfer, and hence transmits print data. The print data is transmitted to the printing apparatus 3 via the host I/F 21a to which the host computer is connected, and the connecting means 25, and then used in the printing process (S4). Thereafter, the priority of the host I/F 21a connected to the host computer which is the transmission source of the printed data is lowered in the priority table 23 (S5). The data transfer apparatus 2 implements the above-mentioned process on all of the print requests. Specifically, if the printing process has not yet been performed with respect to all of the print requests, or if the result of judgement in step S6 is No, the control returns to step S1, and, if the printing process has been performed with respect to all of the print requests, or if the result of the judgement in step S6 is Yes, the process is ended.

Also in the case where the data transfer is started by using a busy signal as described above, the printing system is configured in the same manner as shown in FIG. 1, except that the controls in the host I/Fs 21a, 21b, and 21c are performed in a different manner.

Next, specific examples of the method of changing the order of priority of data transfer in the priority table 23 will be described. The changing method may be performed in either of the following three manners.

SPECIFIC EXAMPLE 1

Figure 4A:
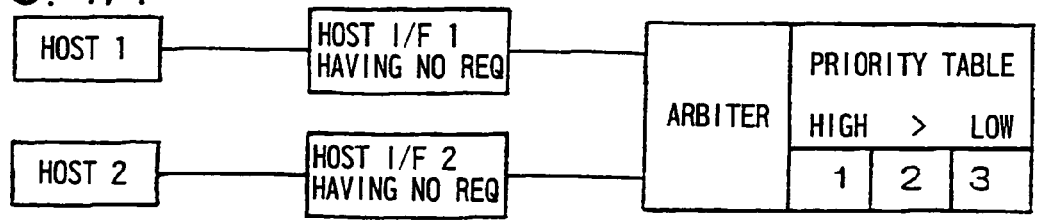
FIGS. 4A to 4D, 5A to 5D, and 6A to 6E are diagrams showing specific example 1 of a method of changing the order of priority of data transfer in a priority table.

In an initial state shown in FIG. 4A, the order of priority of data transfer of the priority table 23 is set by using three identification codes as identification data. In the drawings, numerals "1" to "3" indicating identification code show the identification numbers of the host computers 1a, 1b, and 1c and the host I/Fs 21a, 21b, and 21c, i.e., the numbers indicated in the blocks of FIG. 1, respectively. Namely, the first host computer 1a and the first host I/F 21a are assigned to the first identification code "1", the second host computer 1b and the second host I/F 21b are assigned to the second identification code "2", and the third host computer 1c and the third host I/F 21c are assigned to the third identification code "3". In FIG. 4A, for the sake of convenience in description, the host computer 1c and the host I/F 21c assigned to the identification code "3" are not shown. In the following description, each of the host computers and the host I/Fs is indicated by the number of the corresponding identification code. Specifically, the host computer 1a is indicated as the host 1, the host computer 1b as the host 2, the host computer 1c as the host 3, the host I/F 21a as the host I/F 1, the host I/F 21b as the host I/F 2, and the host I/F 21c as the host I/F 3.

Figure 4B:
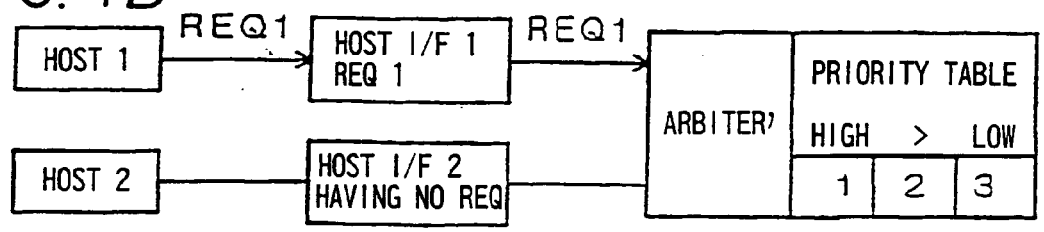

As shown in FIG. 4B, next, in the above-mentioned initial state, a data transfer request (REQ1) is transmitted from the host 1. Then, the host I/F 1 stores the data transfer request command into the command reception register, and outputs the data transfer request to the I/F selecting means (arbiter) 24.

Figure 4C:
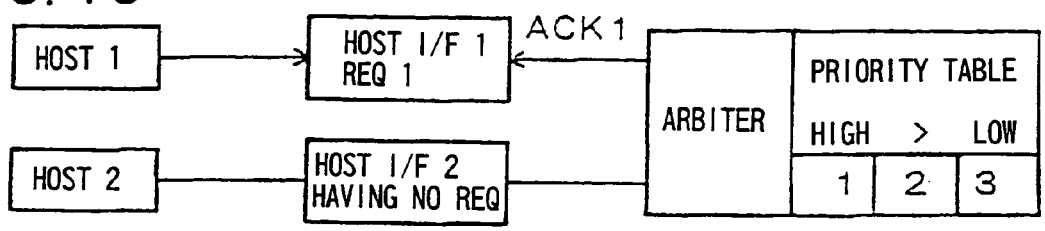

As shown in FIG. 4C, the I/F selecting means (arbiter) 24 then selects a host I/F which is to be enabled to perform a data transfer, on the basis of the priority table 23. At this time, only the host I/F 1 outputs a data transfer request. Therefore, the host I/F 1 is selected, and the I/F selecting means (arbiter) 24 outputs a data transfer enabling signal (ACK 1) to the host I/F 1.

Figure 4D:
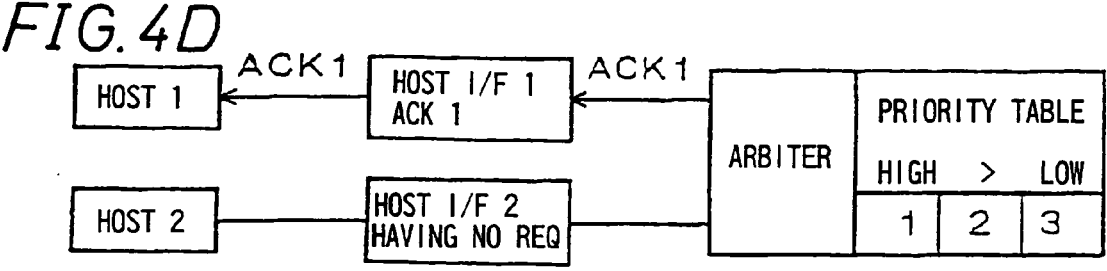

As shown in FIG. 4D, the host I/F 1 which receives the ACK signal from the I/F selecting means (arbiter) 24 outputs the data transfer enabling signal (ACK 1) to the host 1 which is connected to the host I/F.

Figure 5A:
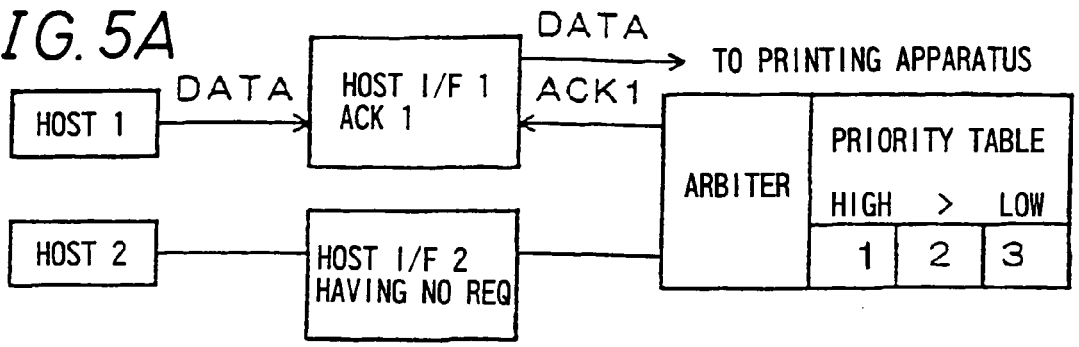

As shown in FIG. 5A, the host 1 which receives the data transfer enabling signal (ACK 1) from the host I/F 1 starts a transfer of print data to the host I/F 1, and the host I/F 1 transfers the print data to the printing apparatus 3 via the connecting means 25. As a result, the printing apparatus implements a print output of the print data.

Figure 5B:
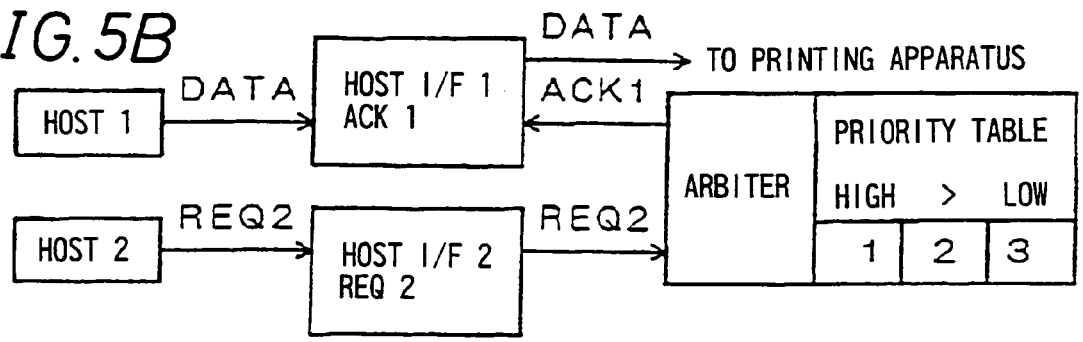

As shown in FIG. 5B, when, during a period when the host 1 is performing the data transfer, the host 2 transmits a data transfer request (REQ2), the host I/F 2 stores the data transfer request command into a command reception register, and outputs the data transfer request to the I/F selecting means (arbiter) 24. At this time, the host 1 is performing the data transfer, or is outputting the ACK 1 to the host I/F 1. Therefore, the I/F selecting means (arbiter) 24 which receives the data transfer request does not give the data transfer enabling signal to the host I/F 2. The host I/F 2 to which ACK 2 has not yet given continues to output the data transfer request until the data transfer enabling signal is given to the host I/F 2.

Figure 5C:
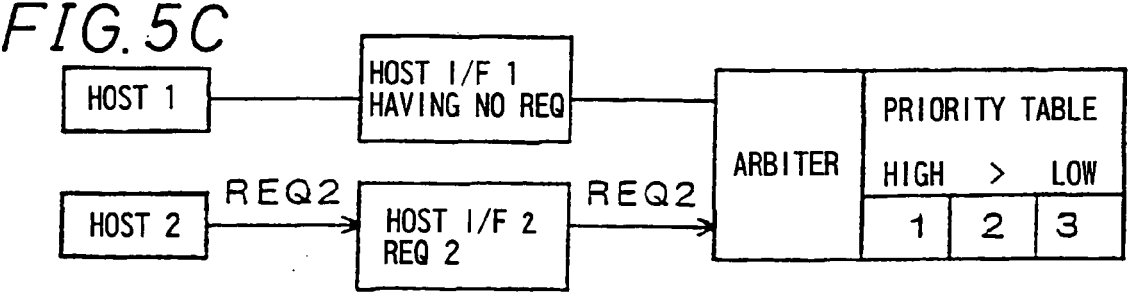
Figure 5D:
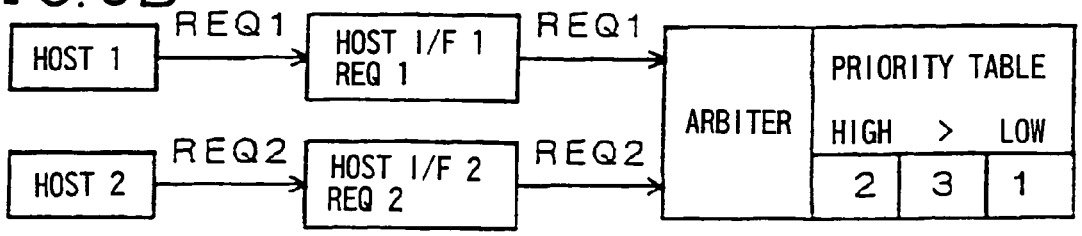

As shown in FIG. 5C, when the data transfer of the host 1 is completed, the I/F selecting means (arbiter) 24 stops the output of the ACK 1 to the host I/F 1. In response to the stop of the output of the ACK 1, the data transfer request of the host 1 is erased away from the register 22a of the host I/F 1. As shown in FIG. 5D, in the priority table 23, the priority of the host I/F 1 which has just ended the printing or has just completed the data transfer is changed to the lowest rank. Namely, the order of priority "1, 2, 3" is changed to "2, 3, 1". It is assumed that the host 1 which has just completed the data transfer transmits a data transfer request immediately after the completion. As a result, the REQ 1 from the host 1 and the REQ 2 from the host 2 are simultaneously input to the I/F selecting means (arbiter) 24.

Figure 6A:
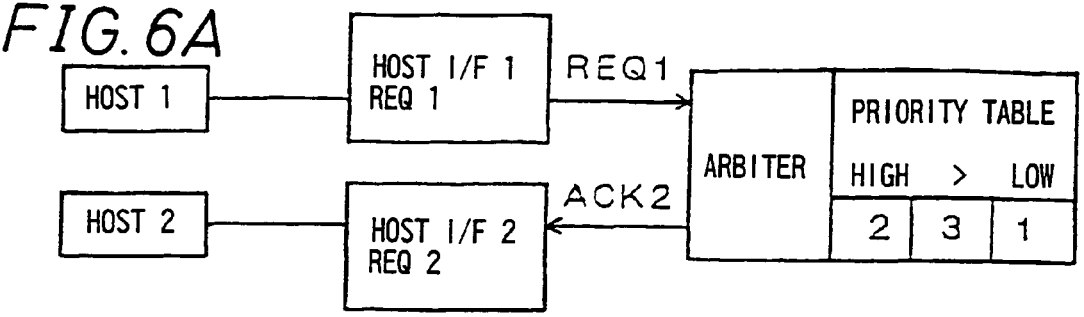
Figure 6B:
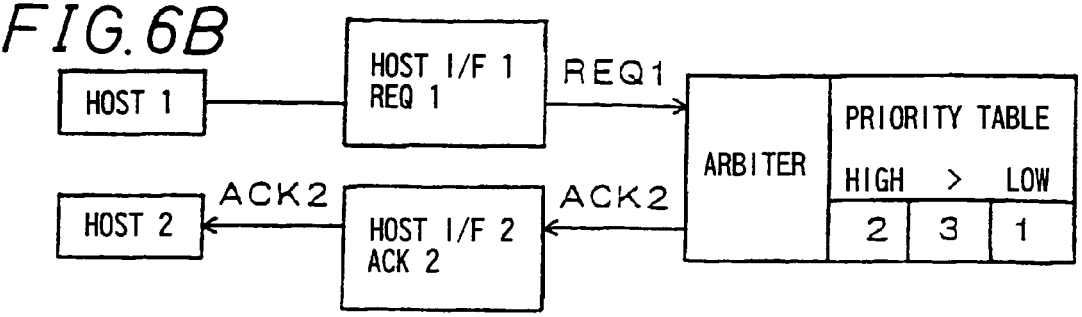

The I/F selecting means (arbiter) 24 selects a host I/F which is to be enabled to perform a data transfer, on the basis of the priority table 23. At this time, the priorities of the host I/Fs 1 and 2 which are outputting a data transfer request are compared with each other, and the host I/F 2 which has a higher priority at this timing is selected. In accordance with the selection result, as shown in FIG. 6A, the I/F selecting means (arbiter) 24 outputs the data transfer enabling signal (ACK 2) to the host I/F 2. As shown in FIG. 6B, the host I/F 2 which receives the ACK signal from the I/F selecting means (arbiter) 24 outputs the data transfer enabling signal (ACK 2) to the host 2 which is connected to the host I/F 2.

Figure 6C:
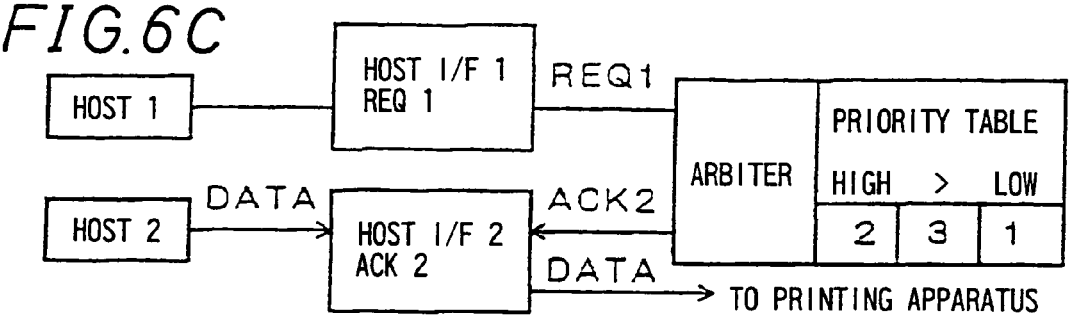

As shown in FIG. 6C, the host 2 which receives the data transfer enabling signal (ACK 2) from the host I/F 2 starts a transfer of print data to the host I/F 2, and the host I/F 2 transfers the print data to the printing apparatus 3 via the connecting means 25. As a result, the printing apparatus implements a print output of the print data. The host I/F 1 to which the ACK 1 has not yet given continues to output the data transfer request until the data transfer enabling signal is given to the host I/F 1.

Figure 6D:
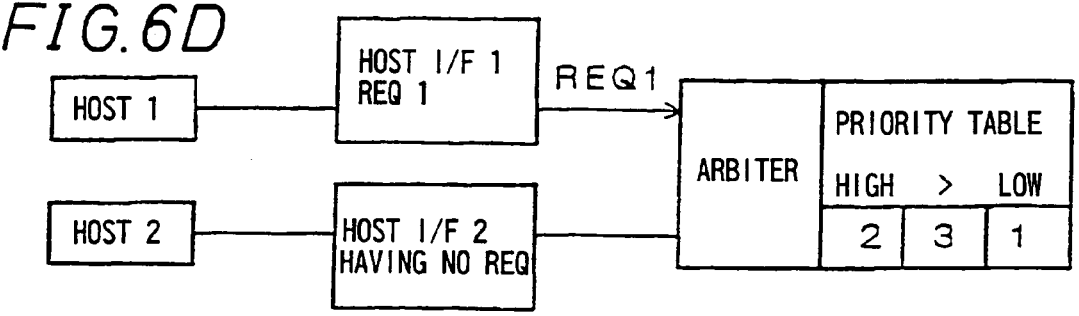
Figure 6E:
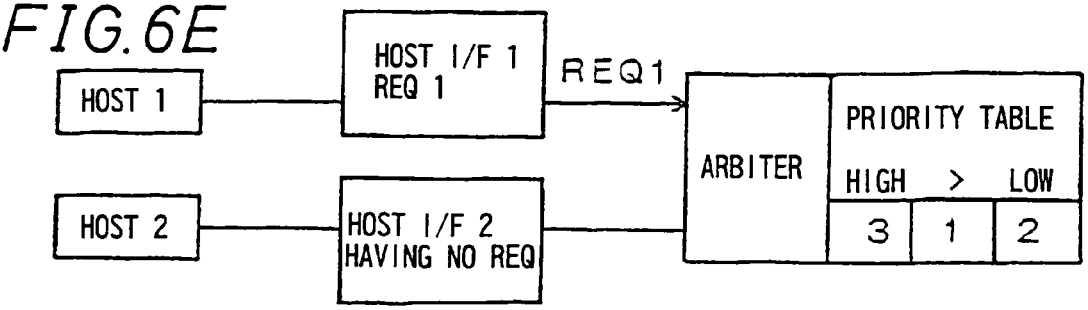

As shown in FIG. 6D, when the data transfer of the host 2 is completed, the I/F selecting means (arbiter) 24 stops the output of the ACK 2 to the host I/F 2. In response to the stop of the output of the ACK 2, the data transfer request of the host 2 is erased away from the register 22b of the host I/F 2. As shown in FIG. 6E, in the priority table 23, the priority of the host I/F 2 which has just ended the printing or has just completed the data transfer is changed to the lowest rank. Namely, the order of priority "2, 3, 1" is changed to "3, 1, 2". At this time, the data transfer enabling signal (ACK 1) is output to the host I/F 1 which is issuing the data transfer request. Thereafter, the processes from FIG. 4C to FIG. 6E are repeated.

As described above, in the operation of specific example 1, the priority of a host I/F which has just ended the printing is changed to a rank which is lower at this timing than the original rank (in specific example 1, to the lowest rank). As a result, the data transfer to the printing apparatus 3 is prevented from being exclusively occupied by a specific host I/F.

In specific example 1 described above, the identification code which is used in the priority table 23 is assigned to the hosts 1, 2, and 3 in one to one relation. Alternatively, a plurality of identification codes may be assigned to each of the hosts. When the priority of a host I/F which has ended the printing is to be changed to a lower rank, the control may be performed so that the priority is lowered not to the lowest rank but by a predetermined number of ranks.

For example, a priority table 23 shown in FIGS. 7A to 7C is configured in such a manner that two identification codes are assigned to each of hosts and, when the priority of a host I/F which has ended the printing is to be changed to a lower rank, the priority is lowered from the original rank by three ranks. When a data transfer with respect to the first host 1 is performed in an initial state shown in FIG. 7A, the priority of the top one of the two identification codes the first host 1 is lowered by three ranks, so that the state shown in FIG. 7B is attained. In the case where at least the conditions that a data transfer request is not issued by the other hosts 2 and 3 are satisfied, when a data transfer with respect to the first host 1 is again performed in the state shown in FIG. 7B, the priority of the one identification code 1 of the first host 1 is further lowered by three ranks, so that the state shown in FIG. 7C is attained.

In the case where a plurality of identification codes are assigned to each of the hosts, the priority table 23 may be configured so as to reflect the usage histories of the hosts 1, 2, and 3, etc.

For example, it is assumed that, as shown in FIG. 8A, four identification codes are assigned to each of the hosts in the priority table 23 of the initial state, and, in this state, a large number of data transfers are performed particularly on the hosts 1 and 2. As a result, as shown in FIG. 8B, the priorities of the identification codes 1 and 2 of the hosts 1 and 2 are individually sequentially lowered, and hence the plurality of identification codes 3 of the host 3 on which substantially no data transfer has been performed during this period are continuously positioned in higher ranks of the priority table 23. In other words, with respect to a host on which a large number of data transfers have not been performed, continuous data transfer processes can be correspondingly easily performed.

On the contrary, the priority of a host on which a data transfer is frequently performed may be set to be higher. This can be realized by making the numbers of identification codes assigned to the hosts different from one another.

Figure 9:
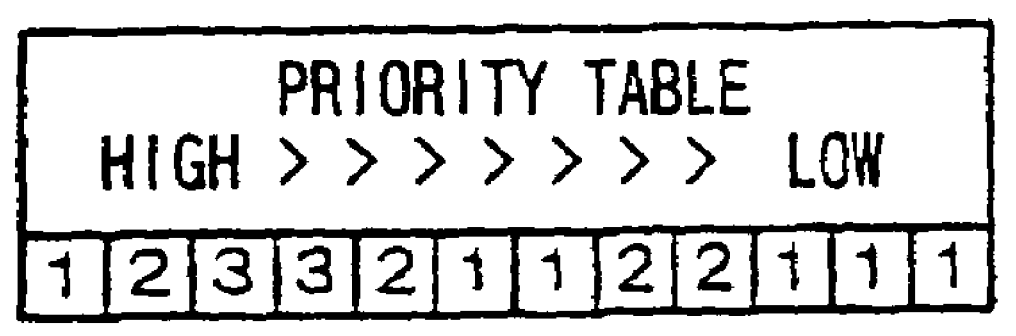

Specifically, the case where the hosts 1, 2, and 3 are connected to the data transfer apparatus 2 and it is expected that the host 1 is subjected most frequently to a data transfer and the host 3 is subjected least frequently to a data transfer will be considered. In this case, as shown in FIG. 9, the numbers of identification codes may be differentiated in such a manner that, for example, six identification code 1 are assigned to the host 1, four identification codes 2 to the host 2, and two identification codes 3 to the host 3. With respect to the host 1 on which the highest number of data transfers are performed, one of the identification codes 1 is often positioned in a higher rank of the priority table 23 because of the larger number of the identification codes 1. Preferably, a larger number of identification codes are assigned to a host as the priority of the host is to be set higher.

SPECIFIC EXAMPLE 2

Figure 10A:
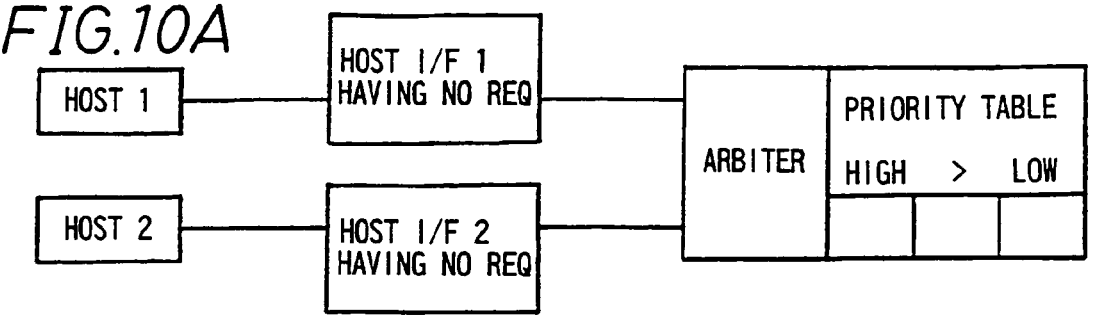
FIGS. 10A to 10D, 11A to 11E, and 12A to 12E are diagrams showing specific example 2 of the method of changing the order of priority of data transfer in a priority table.

In an initial state shown in FIG. 10A, the setting of the order of priority in the priority table 23 on the basis of identification codes as identification data is not performed.

Figure 10B:
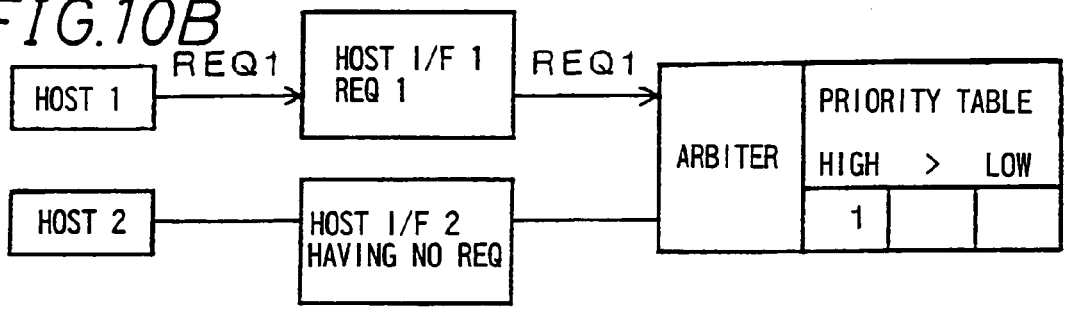

As shown in FIG. 10B, in the above-mentioned initial state, the data transfer request (REQ1) is transmitted from the host 1. Then, the host I/F 1 stores the data transfer request command into the command reception register, and outputs the data transfer request to the I/F selecting means (arbiter) 24. Upon receiving REQ1 from the host I/F 1, the I/F selecting means (arbiter) 24 stores the identification codes 1 of the host 1 into the priority table 23.

Figure 10C:
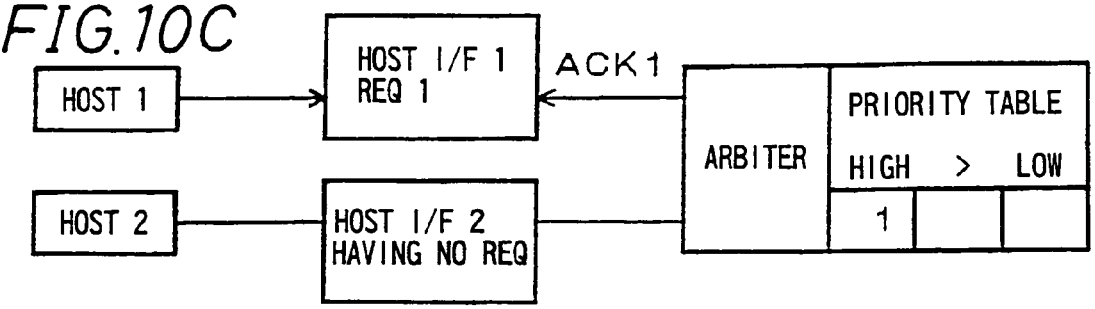

As shown in FIG. 10C, the I/F selecting means (arbiter) 24 then selects a host I/F which is to be enabled to perform a data transfer, on the basis of the priority table 23. At this time, the priority table 23 stores only the identification codes for the host 1. Therefore, the host I/F 1 is selected, and the I/F selecting means (arbiter) 24 outputs a data transfer enabling signal (ACK 1) to the host I/F 1.

Figure 10D:
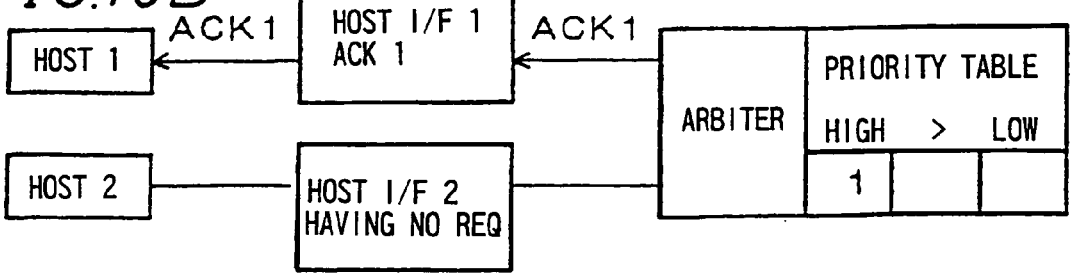

As shown in FIG. 10D, the host I/F 1 which receives the ACK signal from the I/F selecting means (arbiter) 24 outputs the data transfer enabling signal (ACK 1) to the host 1 which is connected to the host I/F 1.

Figure 11A:
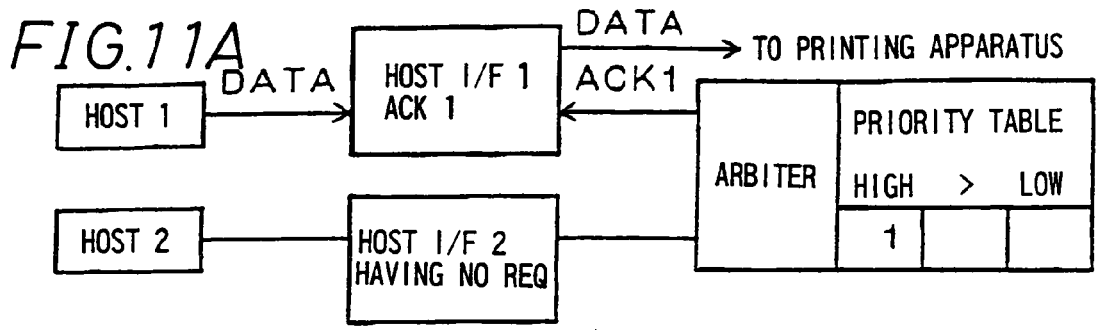

As shown in FIG. 11A, the host 1 which receives the data transfer enabling signal (ACK 1) from the host I/F 1 starts a transfer of print data to the host I/F 1, and the host I/F 1 transfer the print data to the printing apparatus 3 via the connecting means 25. As a result, the printing apparatus implements a print output of the print data.

Figure 11B:
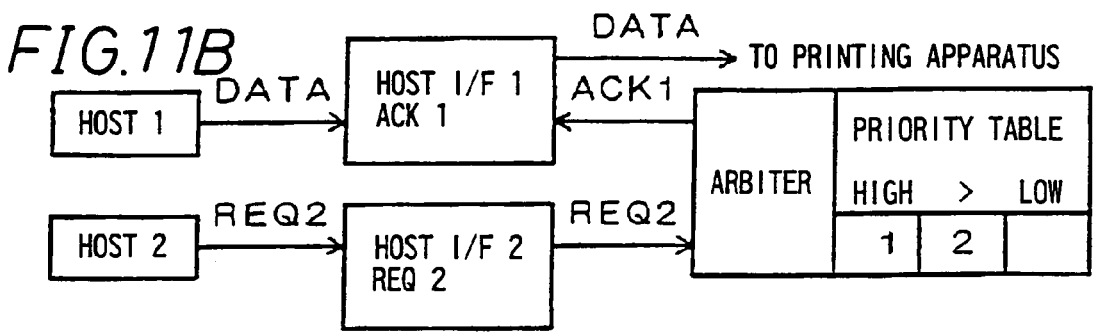

As shown in FIG. 11B, when, during a period when the host 1 is performing the data transfer, the host 2 transmits a data transfer request (REQ2), the host I/F 2 stores the data transfer request command into the command reception register, and outputs the data transfer request to the I/F selecting means (arbiter) 24. At this time, the host 1 is performing the data transfer, or is outputting the ACK 1 to the host I/F 1. Therefore, the I/F selecting means (arbiter) 24 which receives the data transfer request does not give the data transfer enabling signal to the host I/F 2. However, the I/F selecting means stores the identification codes 2 of the host 2 into the priority table 23 because REQ2 is received from the host I/F 2. The host I/F 2 to which ACK 2 has not yet given continues to output the data transfer request until the data transfer enabling signal is given to the host I/F 2.

Figure 11C:
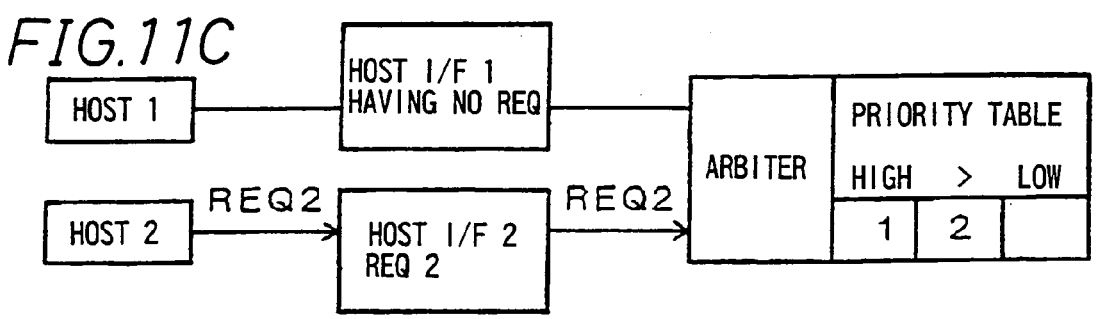
Figure 11D:
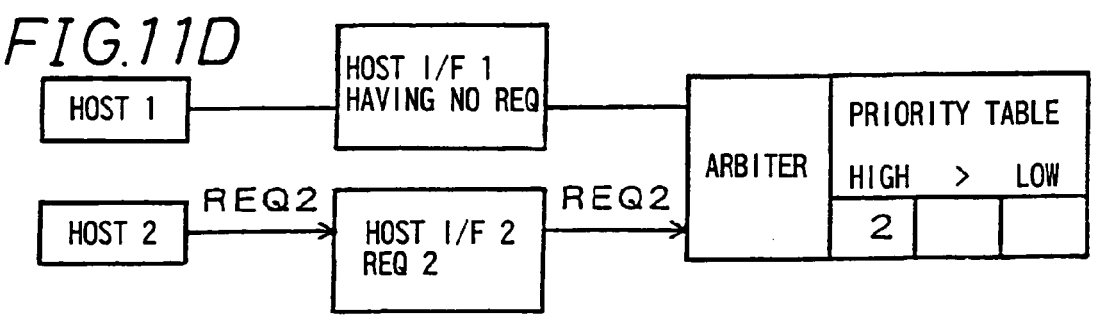
Figure 11E:
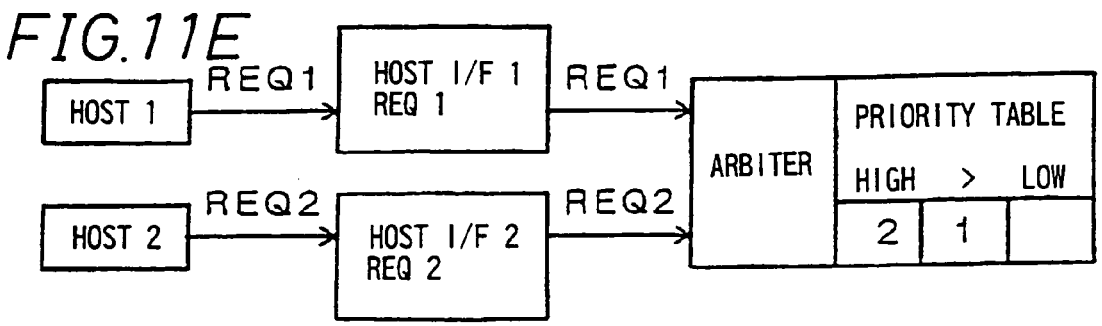

As shown in FIG. 11C, when the data transfer of the host 1 is completed, the I/F selecting means (arbiter) 24 stops the output of the ACK 1 to the host I/F 1. In response to the stop of the output of the ACK 1, the data transfer request of the host 1 is erased away from the register 22a of the host I/F 1. As shown in FIG. 1D, in the priority table 23, the identification codes 1 of the host I/F 1 which has just ended the printing or has just completed the data transfer is deleted and the subsequent identification codes 2 of a lower priority are raised toward a higher priority rank. When the host 1 which has just completed the data transfer transmits a data transfer request immediately after the completion, the identification codes 1 of the host 1 are newly added to the priority table 23 as shown in FIG. 1E. As a result, the REQ 1 from the host 1 and the REQ 2 from the host 2 are input to the I/F selecting means (arbiter) 24.

Figure 12A:
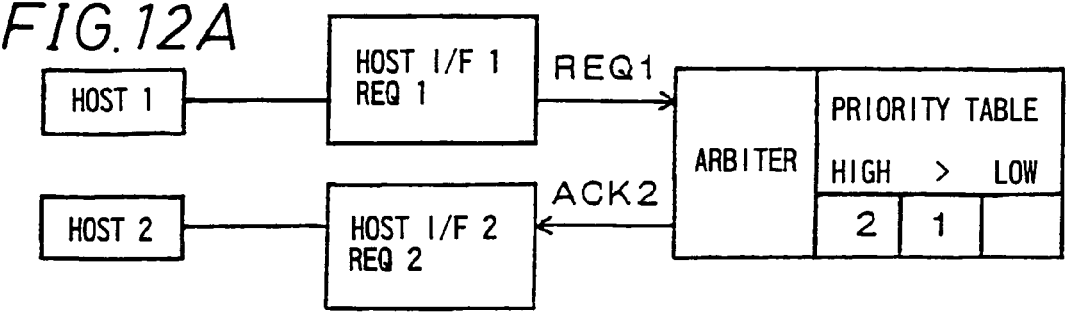
Figure 12B:
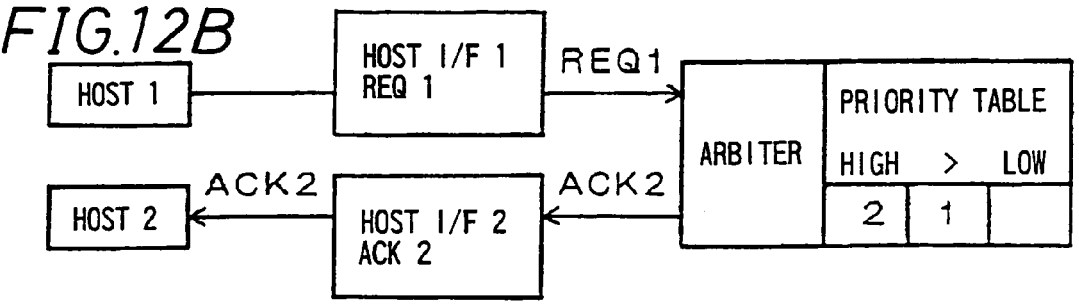

The I/F selecting means (arbiter) 24 selects a host I/F which is to be enabled to perform a data transfer, on the basis of the priority table 23. At this time, the priorities of the host I/Fs 1 and 2 which are outputting a data transfer request are compared with each other, and the host I/F 2 which has a higher priority at this timing is selected. In accordance with the selection result, as shown in FIG. 12A, the I/F selecting means (arbiter) 24 outputs the data transfer enabling signal (ACK 2) to the host I/F 2. As shown in FIG. 12B, the host I/F 2 which receives the ACK signal from the I/F selecting means (arbiter) 24 outputs the data transfer enabling signal (ACK 2) to the host 2 which is connected to the host I/F 2.

Figure 12C:
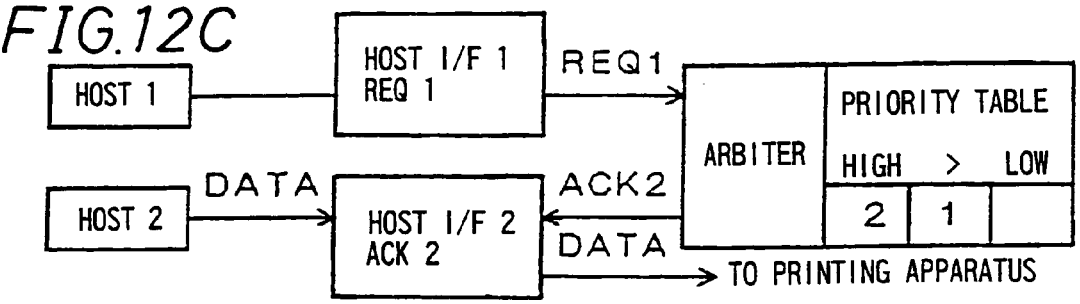

As shown in FIG. 12C, the host 2 which receives the data transfer enabling signal (ACK 2) from the host I/F 2 starts a transfer of print data to the host I/F 2, and the host I/F 2 transfers the print data to the printing apparatus 3 via the connecting means 25. As a result, the printing apparatus implements a print output of the print data. The host I/F 1 to which ACK 1 has not yet given continues to output the data transfer request until the data transfer enabling signal is given to the host I/F 1.

Figure 12D:
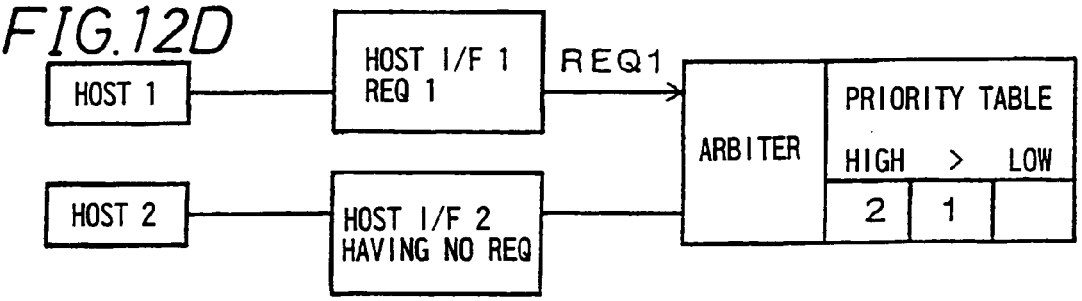
Figure 12E:
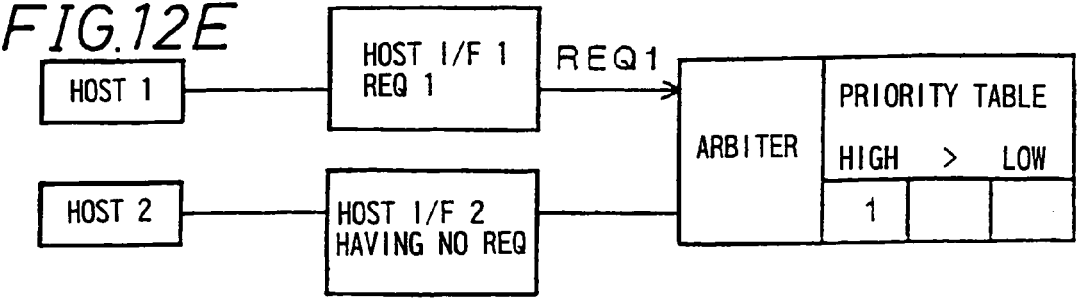

As shown in FIG. 12D, when the data transfer of the host 2 is completed, the I/F selecting means (arbiter) 24 stops the output of the ACK 2 to the host I/F 2. In response to the stop of the output of the ACK 2, the data transfer request of the host 2 is erased away from the register 22b of the host I/F 2. As shown in FIG. 12E, in the priority table 23, the identification codes 2 of the host I/F 2 which has just ended the printing or has just completed the data transfer is deleted and the subsequent identification code 1 of a lower priority is raised to a higher priority rank. At this time, the data transfer enabling signal (ACK 1) is output to the host I/F 1 which is issuing the data transfer request. Thereafter, the processes from FIG. 10C to FIG. 12E are repeated.

As described above, in the operation of specific example 2, only the identification code of a host the data transfer request of which is accepted is added to the priority table 23, and the identification codes of a host which has ended a data transfer are deleted from the table. According to this configuration, the data transfer can be performed in the order of acceptance of the data transfer request.

SPECIFIC EXAMPLE 3

In the priority table 23 of specific example 3, as shown in FIGS. 13A to 13C, identification codes as identification data of the host I/Fs and transfer amounts in the hosts are stored in a corresponding manner. The priorities are set so as to be higher as the data transfer amount is smaller.

For example, the priority table 23 is in the state shown in FIG. 13A. When a data transfer from the host 1 is performed in this state, as shown in FIG. 13B, the data transfer amount of the host 1 is cumulatively updated after the data transfer is ended. As shown in FIG. 13C, the update of the data transfer amount of the host 1 causes the priorities of the hosts to be changed (rearranged) so that a priority is higher as the data transfer amount is smaller.

As described above, in the operation of specific example 3, the priority of a host is higher as the data transfer amount is smaller. Therefore, a data transfer can be performed while attaining impartiality, on the basis of the transfer amount in place of the number of transfers.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A data transfer apparatus interposed between a plurality of host apparatuses which perform a data transfer, and peripheral apparatuses which receive transfer data from the host apparatuses and process the data, for controlling a data transfer from the host apparatuses to the peripheral apparatuses, the data transfer apparatus comprising:
a plurality of host I/Fs disposed so as to be in a one-to one correspondence with the host apparatuses, for transmitting and receiving data to and from the corresponding host apparatuses, each of the plurality of host I/Fs having a register for holding a data transfer request from the corresponding host apparatus;
a rewritable priority table;
I/F selecting means for selecting one from among the host I/Fs holding a data transfer request, to be enabled to perform the data transfer, referring contents of the priority table; and
connecting means for connecting the host I/F which is selected by the I/F selecting means, to the peripheral apparatus.

2. The data transfer apparatus of claim 1, wherein the host I/F which is selected from among the plurality of host I/Fs by the I/F selecting means sends a data transfer enable signal to the corresponding host apparatuses.

3. The data transfer apparatus of claim 1, wherein when a data transfer request from any one of the host apparatuses is received, a busy signal is sent to all of the host apparatuses via the host I/Fs, and the host I/F which is selected by the I/F selecting means makes the busy signal sent to the corresponding host apparatus inactive.

4. The data transfer apparatus of claim 1, wherein the registers of the host I/Fs can hold a plurality of the data transfer requests.

5. The data transfer apparatus of claim 1, wherein the rewritable priority table has a structure in which an order of arrangement of identification codes assigned to the respective host I/Fs indicates an order of priority of data transfer, and a rewriting process of transferring an identification code as identification data assigned to a host I/F which has completed the data transfer, to a lower priority of data transfer is performed.

6. The data transfer apparatus of claim 5, wherein an arbitrary number of identification codes can be assigned to each of the host I/Fs.

7. The data transfer apparatus of claim 1, wherein the rewritable priority table has a structure in which an order of arrangement of identification codes as identification data assigned to the respective host I/Fs indicates an order of priority of data transfer, and in the rewritable priority table, an identification code which is assigned to a host I/F which has received the data transfer request, is added to a lowest priority side of the arrangement, an identification code assigned to a host I/F which has completed the data transfer is deleted, and remaining identification codes in a lower priority side are sequentially made higher toward a position of the deleted identification code.

8. The data transfer apparatus of claim 1, wherein the priority table has a structure in which an order of arrangement of identification codes as identification data assigned to the respective host I/Fs paired with data transfer amounts indicates an order of priority of data transfer, and in the priority table, a transfer amount corresponding to a host I/F which has performed a data transfer is cumulatively updated, and the identification codes are rearranged so that a priority is higher as the transfer amount is smaller.

9. A method of controlling a data transfer apparatus interposed between a plurality of host apparatuses which perform a data transfer, and peripheral apparatuses which receive transfer data from the host apparatuses and process the data, for controlling a data transfer from the host apparatuses to the peripheral apparatuses, the method comprising the steps of:

holding data transfer requests from the host apparatuses, in host I/Fs disposed so as to be in a one-to one correspondence with the host apparatuses;

selecting a host I/F from among host I/Fs holding a data transfer request, on the basis of an order of priority of a priority table which is rewritable, the selected host I/F being to be enabled to perform a data transfer; and when a data transfer is completed, updating a priority of the host I/F which has completed the data transfer, in the priority table.

10. The method of controlling the data transfer apparatus of claim 9, the method further comprising the step of:

sending a data transfer enabling signal from the selected host I/F to a host apparatus corresponding thereto.

11. The method of controlling the data transfer apparatus of claim 9, the method further comprising the steps of:

when a data transfer request from any one of the host apparatuses is received, sending a busy signal to all of the host apparatuses via the host I/Fs; and making the selected host I/F to cause the host apparatus corresponding thereto, to inactivate the busy signal.

12. A printing system comprising:

a plurality of host apparatuses for performing a data transfer;

a printing apparatus for receiving data transferred from the host apparatuses and performing a printing process; and the above-described data transfer apparatus of claim 1, which is connected between the host apparatuses and the printing apparatus.

* * * * *

UNITED STATES PATENT AND TRADEMARK OFFICE
CERTIFICATE OF CORRECTION

PATENT NO. : 6,940,616 B1
DATED : September 6, 2005
INVENTOR(S) : Naoki Irisa

It is certified that error appears in the above-identified patent and that said Letters Patent is hereby corrected as shown below:

Title page,
Item [73], Assignee, delete "This patent is subject to a terminal disclaimer.".

Signed and Sealed this

Twenty-fourth Day of January, 2006

JON W. DUDAS
*Director of the United States Patent and Trademark Office*